(12) United States Patent
Friedlaender

(10) Patent No.: US 9,643,108 B2
(45) Date of Patent: May 9, 2017

(54) SEDIMENTATION DEVICE FOR SEPARATING A MATERIAL MIX AND METHOD FOR REMOVING SEDIMENT FROM A SEDIMENTATION DEVICE

(71) Applicant: KRONES AG, Neutraubling (DE)

(72) Inventor: Thomas Friedlaender, Regensburg (DE)

(73) Assignee: KRONES AG, Neutraubling (DE)

( * ) Notice: Subject to any disclaimer, the term of this patent is extended or adjusted under 35 U.S.C. 154(b) by 414 days.

(21) Appl. No.: 14/272,132

(22) Filed: May 7, 2014

(65) Prior Publication Data

US 2014/0346123 A1    Nov. 27, 2014

(30) Foreign Application Priority Data

May 21, 2013    (DE) .................. 10 2013 209 282

(51) Int. Cl.
| | | |
|---|---|---|
| *B01D 21/24* | (2006.01) | |
| *B01D 21/28* | (2006.01) | |
| *B01D 21/00* | (2006.01) | |
| *C02F 1/36* | (2006.01) | |

(Continued)

(52) U.S. Cl.
CPC ....... *B01D 21/283* (2013.01); *B01D 21/0045* (2013.01); *B01D 21/245* (2013.01); *B01D 21/2427* (2013.01); *B01D 21/2461* (2013.01); *B01D 21/34* (2013.01); *C02F 1/36* (2013.01);

(Continued)

(58) Field of Classification Search
CPC ...... B01D 29/115; B01D 37/00; B01D 29/52; B01D 29/865; B01D 2201/0415; B01D 2201/0446; B01D 2201/127; B01D 21/283; B01D 2021/0081; B01D 43/00; B01D 21/28; B01D 21/24; B01J 19/10; C02F 1/36

See application file for complete search history.

(56) References Cited

U.S. PATENT DOCUMENTS

| 2,688,402 A | 9/1954 | Butterworth |
|---|---|---|
| 4,055,491 A | 10/1977 | Porath-Furedi |

(Continued)

FOREIGN PATENT DOCUMENTS

| AT | 413655 B | 4/2006 |
|---|---|---|
| DE | 738642 A | 8/1943 |

(Continued)

OTHER PUBLICATIONS

Search report for DE10 2013 209 282.2, dated Nov. 8, 2013.

*Primary Examiner* — Walter D Griffin
*Assistant Examiner* — Cameron Allen
(74) *Attorney, Agent, or Firm* — Marshall, Gerstein & Borun LLP

(57) ABSTRACT

A sedimentation device for separating a material mix, preferably plastic flakes, including a sedimentation basin configured to receive the material mix and a liquid, for example water; an inlet configured to introduce the material mix and/or the liquid into the sedimentation basin; an outlet configured to remove sediment from the sedimentation basin; at least one stilling plate within the sedimentation basin configured as an ultrasonic oscillating element. The invention moreover relates to a method for removing sediment from a sedimentation device.

16 Claims, 3 Drawing Sheets

(51) Int. Cl.
*B01D 21/34* (2006.01)
*C02F 1/00* (2006.01)

(52) U.S. Cl.
CPC .... *C02F 2001/007* (2013.01); *C02F 2305/12* (2013.01)

(56) References Cited

U.S. PATENT DOCUMENTS

| | | | | |
|---|---|---|---|---|
| 4,893,999 | A | * | 1/1990 | Chmelir ............... B01J 19/22 264/212 |
| 5,164,094 | A | * | 11/1992 | Stuckart ............... B01D 21/283 204/157.15 |
| 2008/0156737 | A1 | | 7/2008 | Janssen et al. |
| 2011/0262990 | A1 | | 10/2011 | Wang et al. |
| 2012/0071633 | A1 | * | 3/2012 | Khyse-Andersen ..... C07K 1/22 530/367 |

FOREIGN PATENT DOCUMENTS

| | | | | |
|---|---|---|---|---|
| DE | 959454 | B | | 3/1957 |
| DE | 1268560 | A | | 5/1968 |
| DE | 3443486 | A1 | | 5/1986 |
| DE | 4000150 | A1 | * | 7/1991 ............. B01D 21/02 |
| DE | 4440707 | B4 | | 1/2005 |
| EP | 0053094 | A2 | | 6/1982 |
| EP | 0292470 | A1 | | 11/1988 |
| EP | 1138635 | A1 | | 10/2001 |
| JP | S521567 | A | | 1/1977 |
| JP | S58128113 | A | | 7/1983 |
| WO | WO-03101582 | A1 | | 12/2003 |

\* cited by examiner

SEDIMENTATION DEVICE FOR SEPARATING A MATERIAL MIX AND METHOD FOR REMOVING SEDIMENT FROM A SEDIMENTATION DEVICE

CROSS-REFERENCE TO RELATED APPLICATION

The application claims priority of German Application No. 10 2013 209 282.2, filed May 21, 2013. The priority application, DE 10 2013 209 282.2 is hereby incorporated by reference.

FIELD OF THE DISCLOSURE

The disclosure relates to a sedimentation device and method for separating a material mix according to the preamble of claim 1 and a method for it.

BACKGROUND

It is well-known that solids that are difficult to sediment are sedimented in large stilling containers over quite a long period. In the moment where the solids are drawn off, they are swirled back into the liquid, so that it becomes necessary for the sediment to settle again. To support sedimentation, stilling plates are introduced into the liquid.

It is known from waterworks sludges that a conditioning of waterworks sludges in stationary ultrasonic fields leads to improved sedimentation and to a faster purification of the fluid phase.

SUMMARY OF THE DISCLOSURE

It is an aspect of the present disclosure to provide a device and a method which allow an optimal and time-reduced separation between liquid and sediment.

The sedimentation device for separating a material mix, preferably plastic flakes, comprises a sedimentation basin which is configured to receive the material mix and a liquid, for example water. The sedimentation device moreover comprises an inlet which is configured to introduce the material mix and/or the liquid into the sedimentation basin, and an outlet which is configured to remove sediment from the sedimentation basin. At least one stilling plate is arranged within the sedimentation basin, said at least one stilling plate being configured as ultrasonic oscillating element.

For generating ultrasonic sound, the ultrasonic oscillating elements are excited, for example, by an electric generator with the corresponding frequency. For example, piezoelectric and/or magnetostrictive oscillators may be used.

The at least one ultrasonic oscillating element supports sedimentation and reduces another swirling of sediment in the sedimentation basin when sediment is being removed through the outlet. Thus, the time the sediment needs for settling and being removed may be reduced, and moreover, the sedimentation device may be selected to have a smaller structural size compared to a sedimentation device without ultrasonic oscillating plates.

The ultrasonic sound propagates in the form of longitudinal waves and causes a periodic compaction and relaxation in the liquid. Microscopically small cavities are formed in the liquid (cavitation) by the action of an underpressure in the relaxation phase. Due to a local shortfall of the liquid vapor or gas saturation pressure, the cavitation bubbles that are formed consist of a liquid vapor-gas mixture. The cavitation bubbles initially pulsate in tune with the ultrasonic oscillation while their volumes increase. When a critical value is reached, a bubble collapse occurs in the pressure phase. This bubble implosion is characterized by high pressure differentials and an extreme temperature rise in the bubble and its directly surrounding area. By the hydromechanical forces triggered during ultrasonic cavitation, material flakes of the material mix may be decomposed into individual material particles.

The term material mix comprises, for example, plastic flakes of different sizes, where even a powdery proportion, e.g. of pulverized plastic flakes, of the plastic may be present. The material mix may also comprise, for example, different types of plastic in the form of plastic flakes of different sizes and/or one powdery proportion or several powdery proportions.

At the beginning of a separation of a material mix, the material mix and the liquid may be introduced into the sedimentation basin, for example, by means of the inlet, so that a first filling of the sedimentation basin is available. If a desired amount of material mix is present in the sedimentation basin, the introduction of a material mix through the inlet may be stopped, and only liquid is introduced into the sedimentation basin. The introduction of liquid may be controlled by means of a valve, and the introduction of material mix may be controlled by means of a gate. During separation, i.e. while the sediment is settling at the bottom of the sedimentation basin, the outlet is advantageously closed. For removing sediment, the outlet may be opened. While the sediment is being removed, a part of the liquid which is, for example, bound in the sediment and/or embedded between particles of the sediment, is also removed.

The sedimentation device may furthermore comprise an admission which is configured to introduce liquid into the sedimentation basin. Said admission may introduce liquid into the sedimentation basin in addition to the inlet, or said admission may introduce liquid into the sedimentation basin exclusively.

A bottom of the sedimentation basin may be funnel-shaped, the outlet being preferably disposed in the mouth of the funnel. By the funnel-shape, the sediment may slide into the funnel tip by gravity. Preferably, the inclination of the bottom to the horizontal line is more than 60°. If the inclination has a smaller value, a mechanical scraper may moreover be provided which transports the sediment to the funnel tip.

The outlet may furthermore comprise a double gate. The double gate may preferably comprise a first gate and a second gate. The outlet may preferably moreover be pointed vertically downwards or inclined with a small inclination—for example 5°, 10°, 15° or 20°—against the vertical line, so that a removal of the sediment may be supported or effected by gravity. For the sediment to be able to deposit in the sedimentation basin, at least the first gate is preferably closed. For the double gate to be able to operate as a kind of lock during the removal of the sediment through the outlet, both the first and the second gates are initially closed. For removing the sediment, the first gate will then be opened, and the sediment will be brought into a space between the first and the second gates, the first gate will be closed and subsequently the second gate opened.

Moreover, the outlet may comprise a worm. The worm may support a removal of the sediment through the outlet, so that it is not necessary for the outlet to be directed vertically downwards or inclined with a small inclination—for example 5°, 10°, 15° or 20°—against the vertical. For example, the outlet may extend horizontally or obliquely to the top.

In another embodiment, the sedimentation device may furthermore comprise a sand inlet. The sand may be added to the liquid and the material mix in the sedimentation basin to achieve improved sedimentation.

For this embodiment of the sedimentation device, a bottom of the sedimentation basin may be embodied to be flat, i.e. to preferably extend horizontally, where the outlet is preferably disposed in a side wall of the sedimentation basin. The sand will deposit together with the sediment on the flat bottom, the sand proportion in the sediment also ensuring that the sediment is swirled again to a lower extent when sediment is being removed from the sedimentation basin.

The outlet may furthermore comprise a conveyor, transverse ribs being preferably disposed on the conveyor. The sediment together with the sand proportion may be easily removed through the outlet by means of a conveyor with transverse ribs. Preferably, the outlet in this case extends horizontally or obliquely to the top. Instead of the transverse ribs, other three-dimensional structures, for example honeycombs, may be provided on the conveyor, said structures being suited for removing the sediment from the sedimentation basin together with the sand proportion.

The sedimentation device may furthermore comprise a pusher which is disposed at the bottom of the sedimentation basin and configured to be moved along the bottom and bring sediment to the outlet.

The sedimentation device may furthermore comprise a control device which is configured to stop an introduction of liquid into the sedimentation basin through the inlet and to start emission of ultrasonic sound through the at least one stilling plate within the sedimentation basin, and subsequently start a removal of the sediment from the sedimentation basin through the outlet. Moreover, the control device is configured to stop the removal of the sediment from the sedimentation basin through the outlet and to then start the introduction of liquid into the sedimentation basin through the inlet, and to stop the emission of ultrasonic sound through the at least one stilling plate within the sedimentation basin.

By the control device, liquid supply may thus be stopped before the removal of sediment, and by starting the emission of ultrasonic sound through the at least one stilling plate, sedimentation may be supported, so that another swirl of sediment while the sediment is being removed through the outlet may be reduced or eliminated. After the removal of sediment has been stopped, the emission of ultrasonic sound through the at least one stilling plate may be stopped, resulting in a longer service life of the ultrasonic oscillating elements compared to a permanent operation. Moreover, the introduction of liquid into the sedimentation basin is continued.

A method for removing sediment from a sedimentation device as described above and/or further below comprises the following steps: stopping an introduction of liquid through the inlet into the sedimentation basin and starting the emission of ultrasonic sound through the at least one stilling plate. These two steps may be performed one after another or simultaneously. In a further step, a start of a removal of sediment through the outlet is subsequently accomplished, and in the next step, a stop of the removal of the sediment through the outlet is accomplished. In two further steps, a start of an introduction of liquid through the inlet into the sedimentation basin, and a stop of the emission of ultrasonic sound through the at least one stilling plate are accomplished. Those two latter steps may be performed one after another or simultaneously.

A stop of the removal of sediment through the outlet may be accomplished, for example, after a desired amount of sediment has been removed, or the removal of the sediment has been effected over a desired period.

BRIEF DESCRIPTION OF THE FIGURES

Further advantages and embodiments can be taken from the enclosed drawings. In the drawings.

DETAILED DESCRIPTION

Figure 1:
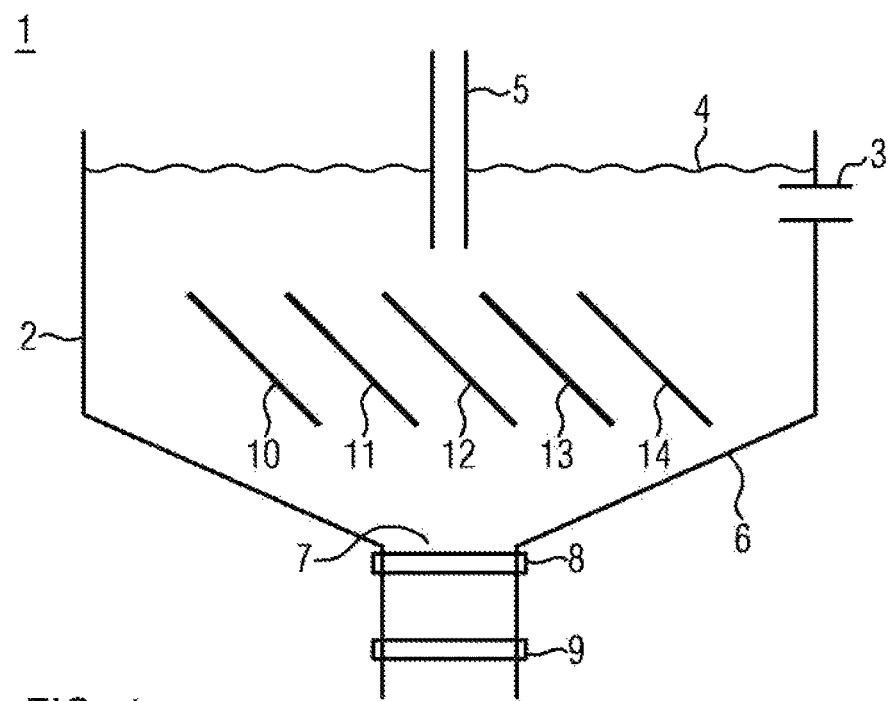
FIG. 1 shows a first embodiment of a sedimentation device for separating material.

FIG. 1 shows a first embodiment of a sedimentation device 1 for separating a material mix. The represented sedimentation device 1 comprises a sedimentation basin 2 with an admission 3 for liquid, for example water, disposed at a side wall of the sedimentation basin 2 and is located, for an operation of the sedimentation basin 2, underneath the surface 4 of the mixture of liquid and the material mix to be separated. An inlet 5 for the material mix and/or the liquid is disposed above the sedimentation basin 2, the opening being located underneath the surface 4 of the mixture of liquid and the material mix to be separated.

The bottom 6 of the sedimentation basin 2 comprises an inclination which is disposed such that the sediment deposited on the bottom 6 or accumulating there reaches an outlet 7 which is here disposed in the middle of the bottom 6 and extends downwards, so that the sediment may be discharged by means of gravity. The outlet 7 comprises a double gate 8, 9 comprising a first gate 8 and a second gate 9 and therefore operates as a kind of lock.

Five stilling plates 10, 11, 12, 13, 14 are moreover arranged within the sedimentation basin 2 and are configured as ultrasonic oscillating elements.

Figure 2:
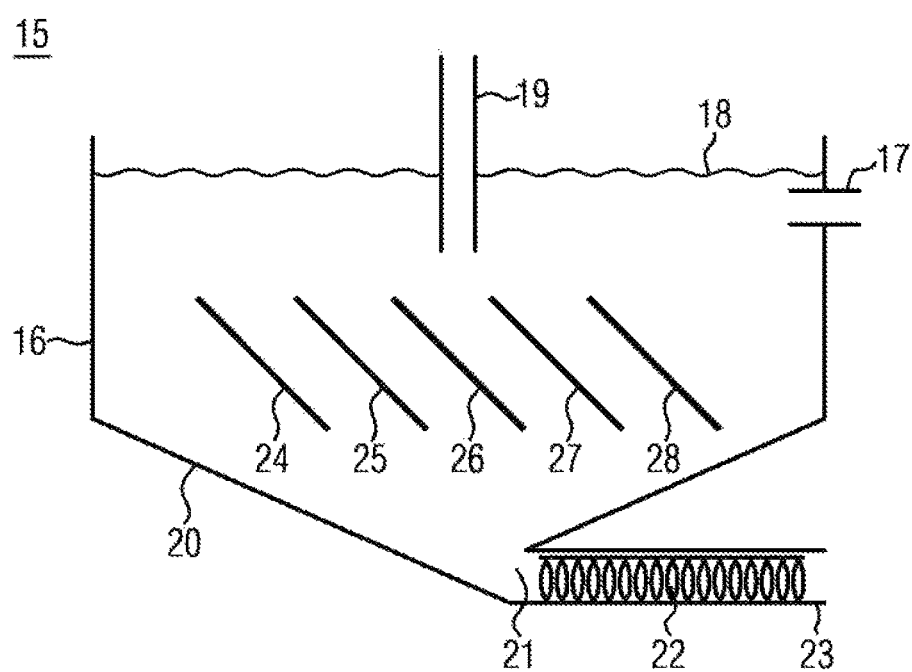
FIG. 2 shows a second embodiment of a sedimentation device for separating material.

FIG. 2 shows a second embodiment of a sedimentation device 15 for separating a material mix. The represented sedimentation device 15 comprises a sedimentation basin 16 with an admission 17 for liquid, for example water, disposed at a side wall of the sedimentation basin 16 and located, for an operation of the sedimentation basin 16, underneath the surface 18 of the mixture of liquid and the material mix to be separated. The inlet 19 for the material mix and/or the liquid is disposed above the sedimentation basin 16, the opening being located underneath the surface 18 of the mixture of liquid and the material mix to be separated.

The bottom 20 of the sedimentation basin 16 comprises an inclination which is arranged such that the sediment deposited or accumulating on the bottom 6 reaches an outlet 21 which is here arranged in the middle of the bottom 20 and extends obliquely to the top. Sediment that accumulates in this region may be discharged by means of a worm 22 via an outlet pipe 23.

Within the sedimentation basin 16, five stilling plates 24, 25, 26, 27, 28 are moreover arranged and configured as ultrasonic oscillating elements.

Figure 3:
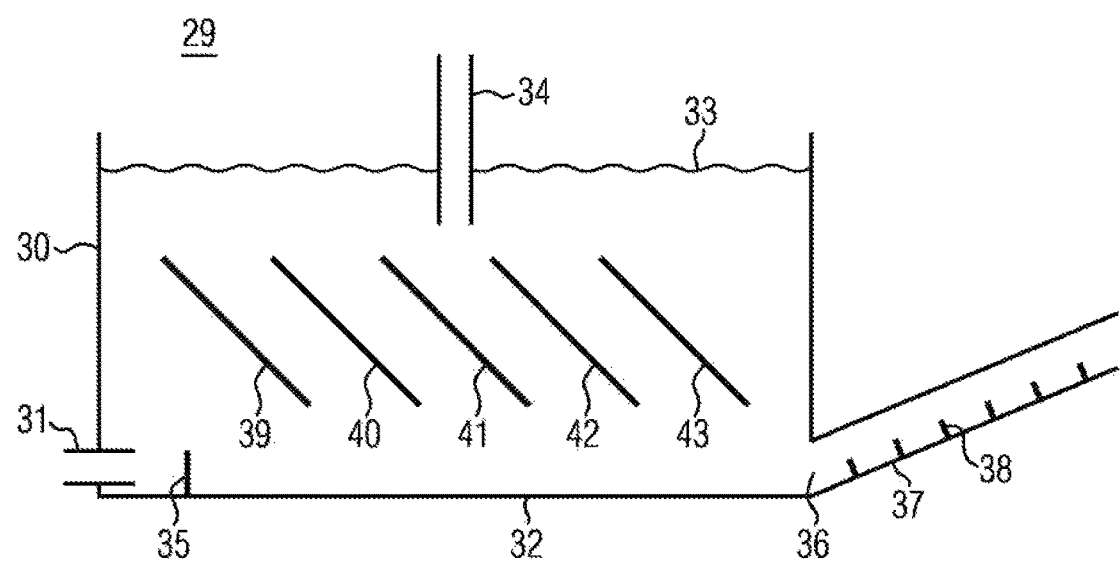
FIG. 3 shows a third embodiment of a sedimentation device for separating material.

FIG. 3 shows a third embodiment of a sedimentation device 29 for separating a material mix. The represented sedimentation device 29 comprises a sedimentation basin 30 with an admission 31 for liquid, for example water, disposed at a side wall of the sedimentation basin 30 near the bottom surface 32 and being located, for an operation of the sedimentation basin 30, underneath the surface 33 of the mixture of liquid and the material mix to be separated. The inlet 34 for the material mix and/or the liquid is disposed above the sedimentation basin 30, the opening being located underneath the surface 33 of the mixture of liquid and the material mix to be separated.

The bottom 32 of the sedimentation basin extends horizontally, and by means of a pusher 35, sediment may be pushed to a drain 36 where said sediment is then removed by means of a conveyor 37 with ribs 38.

Moreover, five stilling plates 39, 40, 41, 42, 43 are arranged within the sedimentation basin 30 and configured as ultrasonic oscillating elements.

Figure 4:
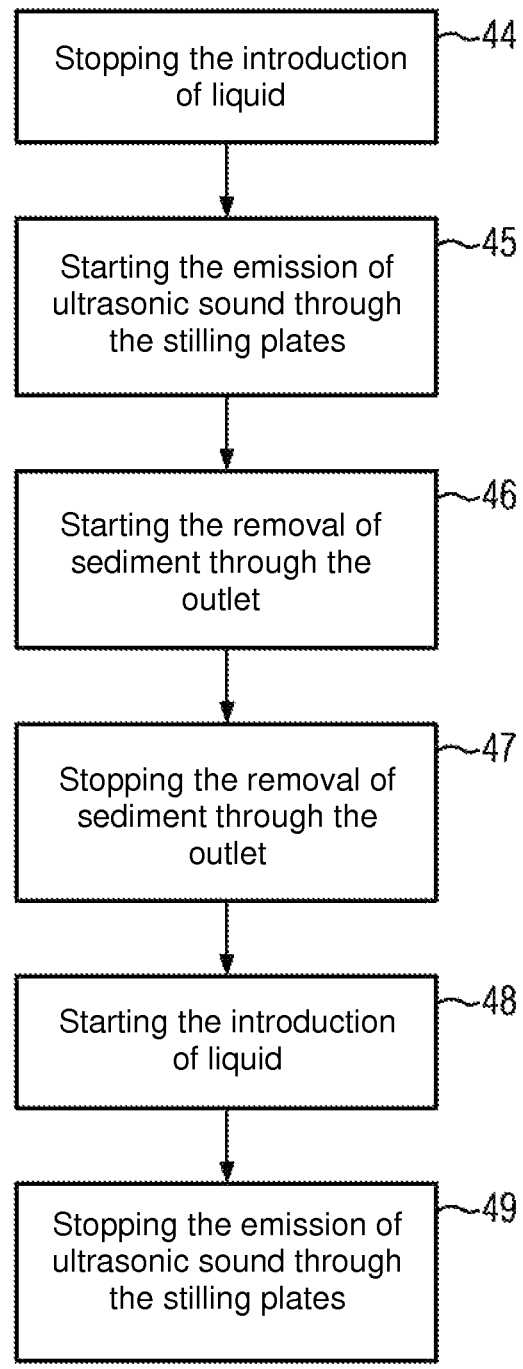
FIG. 4 shows a flow chart of a method for removing sediment from a sedimentation device.

FIG. 4 shows a flow chart of a method for removing sediment from a sedimentation device 1, 15, 29. In a first step 44, an introduction of liquid into the sedimentation basin 2, 16, 30 is stopped, and in a second step 45, an emission of ultrasonic sound through the stilling plates 10-14, 24-28, 39-43 is started. The first step 44 and the second step 45 may also be effected in reverse order or simultaneously.

In a third step 46, a removal of sediment through the outlet 7, 21, 36 is started. After a desired amount of sediment has been removed or the removal of sediment has been accomplished over a desired period, the removal of the sediment through the outlet 7, 21, 36 is stopped in a fourth step 47.

In a fifth step 48, an introduction of liquid into the sedimentation basin 2, 16, 30 is started, and in a sixth step 49, the emission of ultrasonic sound through the stilling plates 10-14, 24-28, 39-43 is stopped. The fifth step 48 and the sixth step 49 may also be effected in reverse order or simultaneously.

The invention claimed is:

1. A sedimentation device for separating a material mix, comprising:
 a sedimentation basin configured to receive the material mix and a liquid,
 an inlet configured to introduce the material mix and/or the liquid into the sedimentation basin,
 an outlet configured to remove sediment from the sedimentation basin,
 at least one stilling plate within the sedimentation basin, and
 the at least one stilling plate configured as an ultrasonic oscillating element for supporting sedimentation and for reducing another swirling of sediment in the sedimentation basin when the sediment is being removed through the outlet.

2. The sedimentation device according to claim 1, and an admission configured to introduce the liquid into the sedimentation basin.

3. The sedimentation device according to claim 1, and a bottom of the sedimentation basin has a funnel-shape.

4. The sedimentation device according to claim 3, and the outlet comprises a double gate.

5. The sedimentation device according to claim 3, and the outlet comprises a worm.

6. The sedimentation device according to claim 1, and a sand inlet.

7. The sedimentation device according to claim 6, and a bottom of the sedimentation basin has a flat design.

8. The sedimentation device according to claim 6, and the outlet comprises a conveyor.

9. The sedimentation device according to claim 6, and a pusher disposed at a bottom of the sedimentation basin and configured to be moved along the bottom and bring sediment to the outlet.

10. The sedimentation device according to claim 1, and a control device configured to:
 stop an introduction of liquid into the sedimentation basin through the inlet and start an emission of ultrasonic sound through the at least one stilling plate within the sedimentation basin, and subsequently start a removal of the sediment from the sedimentation basin through the outlet; and
 stop the removal of sediment from the sedimentation basin through the outlet and then start the introduction of liquid into the sedimentation basin through the inlet, and stop the emission of ultrasonic sound through the at least one stilling plate within the sedimentation basin.

11. The sedimentation device according to claim 1, and the material mix comprises plastic flakes.

12. The sedimentation device according to claim 1, and the liquid comprises water.

13. The sedimentation device according to claim 3, and the outlet is arranged in a funnel mouth of the funnel-shaped sedimentation basin.

14. The sedimentation device according to claim 4, and the double gate comprises a first gate and a second gate.

15. The sedimentation device according to claim 7, and the outlet is arranged in a side wall of the sedimentation basin.

16. The sedimentation device according to claim 8, and a plurality of transverse ribs are arranged on the conveyor.

* * * * *